US005637378A

United States Patent [19]

Hensler et al.

[11] Patent Number: 5,637,378

[45] Date of Patent: Jun. 10, 1997

[54] FLOOR MAT WITH PHOSPHORESCENT BORDER

[75] Inventors: Connie D. Hensler, Kennesaw; Gilbert S. Nowell, Marietta; James R. May, Marietta; Walter Ivkovich, Jr., Marietta, all of Ga.

[73] Assignee: Interface, Inc., Atlanta, Ga.

[21] Appl. No.: 359,048

[22] Filed: Dec. 19, 1994

[51] Int. Cl.$^6$ .................................................... B32B 3/02

[52] U.S. Cl. .......................... 428/192; 52/177; 428/690; 428/913

[58] Field of Search .................................. 428/192, 690, 428/913; 52/177

[56] References Cited

U.S. PATENT DOCUMENTS

| | | | |
|---|---|---|---|
| 3,873,390 | 3/1975 | Cornell et al. | 428/690 |
| 4,058,942 | 11/1977 | Naka | 428/67 |
| 4,211,813 | 7/1980 | Gravisse et al. | 428/263 |
| 4,360,557 | 11/1982 | Miller | 428/142 |
| 4,401,050 | 8/1983 | Britt et al. | 116/205 |
| 4,522,861 | 6/1985 | Dunsworth | 428/913 |
| 5,130,909 | 7/1992 | Gross | 362/153 |

*Primary Examiner*—Alexander Thomas
*Attorney, Agent, or Firm*—Kilpatrick & Cody

[57] ABSTRACT

Floor mats and methods for producing such mats having wear resistant phosphorescent borders that emit light after removal of ambient light so that the mat edges are visible in the event of a power failure in the facility where the mat is used. The mat border may also contain a bright pigment in the border regions and a contrasting pigment in other regions to make the border visually distinctive under normal lighting conditions. The mats may be produced from solid or foamed polyvinyl chloride materials.

2 Claims, 1 Drawing Sheet

FLOOR MAT WITH PHOSPHORESCENT BORDER

This invention relates to vinyl floor mats and to emergency lighting and escape route marking systems.

BACKGROUND OF THE INVENTION

A variety of floor matting products have been produced from solid vinyl and blown vinyl foam. These mats can be used for numerous applications, including homes, offices and factories. Some of these matting products are manufactured with OSHA safety yellow borders, which makes the mat edges visually more apparent. One reason that this is done is for safety reasons so that, for instance, the likelihood of tripping at such edges will be reduced.

Many interior spaces, ranging from aircraft passenger compartments to factory facilities, have insufficient ambient light, in the event of a failure or interruption of their normal lighting sources. This lack of ambient light can make it difficult for persons within such spaces to visually locate exits and reach those exits safely. In recognition of this problem, several different solutions have been suggested, including emergency lighting systems and marking systems such as those described in U.S. Pat. No. 4,360,557 directed to a "Phosphorescent Abrasive Coated Product for Safety Tread," U.S. Pat. No. 4,401,050 directed to a "Phosphorescent Escape Route Indicator," and U.S. Pat. No. 5,130,909 directed to a "Emergency Lighting Strip."

A wide variety of photoluminescent and phosphorescent materials are known and have been previously used, as demonstrated in U.S. Pat. No. 4,211,813 for "Photoluminescent Textile Materials." None of these prior art materials or applications fully meet the need for a phosphorescent material and safety product in certain applications. For instance, it is frequently desirable to have a vinyl mat in industrial applications where the mat is subjected to substantial wear and physical abuse.

SUMMARY OF THE INVENTION

The present invention is a floor mat into which photoactive materials have been incorporated. This causes the mat or, in particular, a border portion of the mat, to phosphoresce so that the border continues to emit light after ambient or incident light has been removed. Preferably, a pigment is also incorporated in the mat. As a result, the mat edge is visually distinctive in both lighted and dark environments. Such a mat is valuable for use, for instance, in factory areas that are not equipped with backup or emergency lighting. Incorporation of the photoactive materials into and throughout at least a portion of the mat ensures that the light-emitting function of the border will continue, even if a portion of the border material is worn away.

It is thus an object of the present invention to provide a floor mat having a distinctive border that is brightly colored and therefore easily visible under normal lighting conditions and which contains phosphorescent material that emits light in the absence of ambient light, thereby making the border highly visible in darkness, so that persons will not trip on the border and can navigate along the border or between two such borders on opposite mat edges in order to locate an exit safely in darkness.

It is another object of the present invention to provide a vinyl material having phosphorescent properties that are wear resistant.

It is a further object of the present invention to provide an anti-fatigue mat with a border marked in a manner intended to reduce the likelihood of tripping.

These and other objects of the present invention will be apparent to those skilled in the art by reference to the drawings and the following detailed description of those drawings and claims.

DETAILED DESCRIPTION OF THE DRAWINGS

Figure 1:
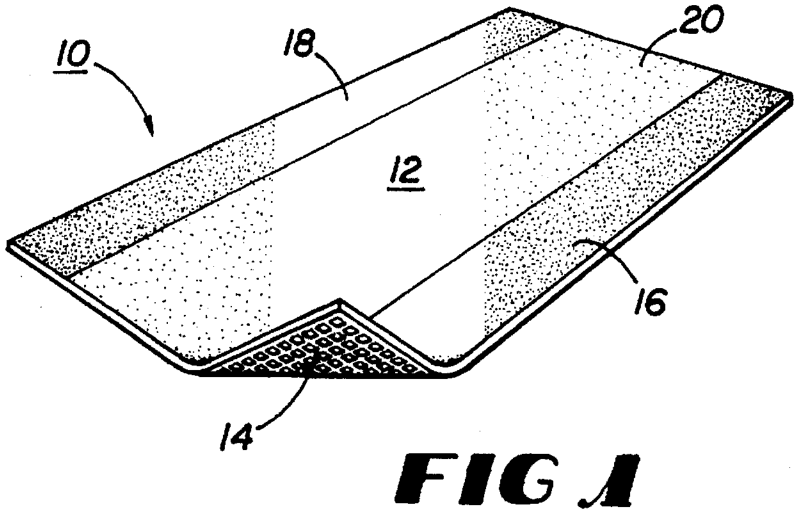
FIG. 1 is a perspective view of a mat in accordance with the present invention.

FIG. 1 shows a perspective view of a mat 10 in accordance with the present invention having a top surface 12, a bottom surface 14, edge strips 16 and 18, and a middle region 20.

Top surface 12 may be formed with ridges or other desired patterns. Bottom surface 14 may also be formed with a desired surface pattern, such as a waffle pattern.

Figure 2:
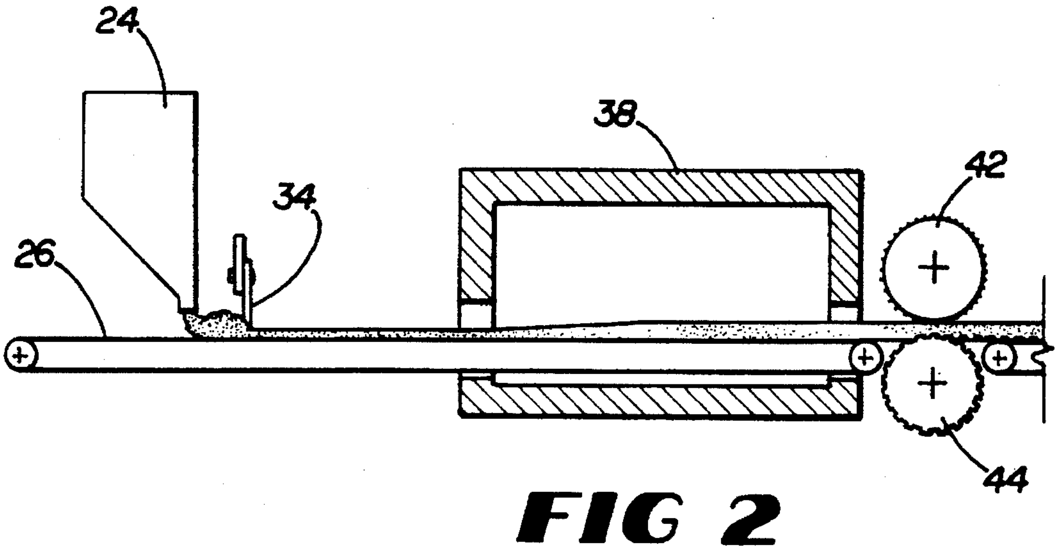
FIG. 2 is a side elevation view of a schematic diagram of a production line for manufacturing a mat in accordance with the present invention.
Figure 3:
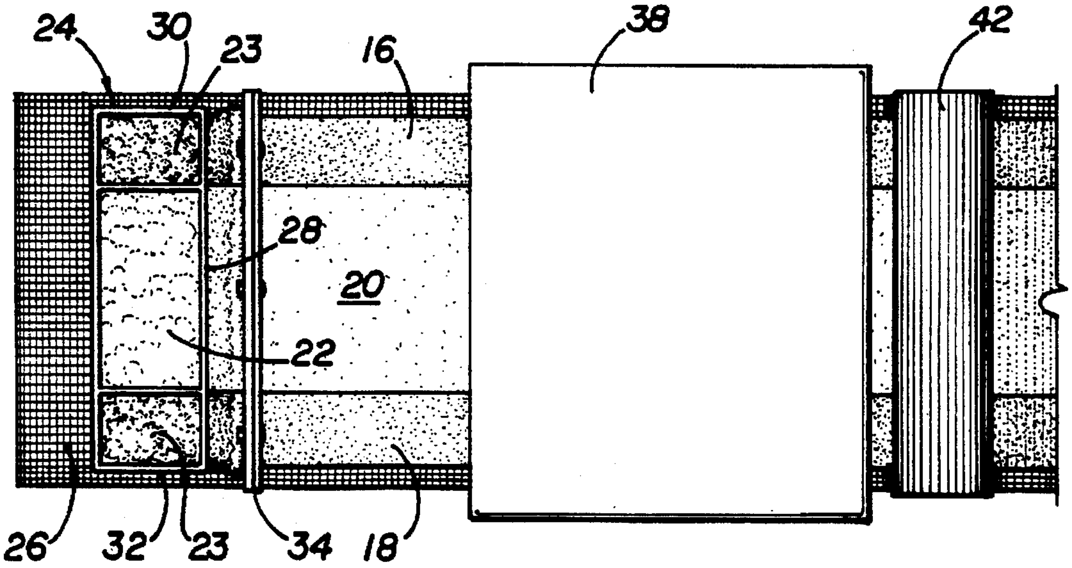
FIG. 3 is a schematic diagram of a top plan view of the production line shown in FIG. 3.

FIGS. 2 and 3 show side elevation and top plan views, respectively, of a production line for manufacture of the mat 10 of the present invention.

As will be appreciated by one skilled in the art, vinyl material 22 and 23 is deposited on belt 26 from a hopper 24 that, as may be seen in FIG. 3, has a middle segment 28 from which vinyl 22 forming the mat middle region is formed, a hopper right segment 30 from which vinyl 23 forming the right edge strip 16 is formed and a hopper left segment 32 from which vinyl 23 forming left edge strip 18 is formed. Vinyl 22 and 23 deposited on the belt then advances under a doctor bar or blade 34 that regulates the thickness of the vinyl 22 and 23 as desired. When applied in liquid form, the flow of the vinyl material causes intimate contact between the edge strips 16 and 18 and the middle region 12 of the mat. When heated, the left and right edge strips 16 and 18 are fused into a single continuous mat with middle region 12.

The vinyl 22 and 23 then passes through an oven 38 (that preferably maintains a temperature between 385° and 450° F.) and off of the belt 26 and through embossing rollers 42 and 44 that impart the desired mat top and bottom patterns.

Optionally, the resulting mat can have an additional clear top coat of polyurethane sprayed onto the mat, followed by a second heat treatment in a second drying oven.

The now-completed mat 10 may now be separated into desired lengths or rolled for shipment and sale in that form.

The following examples set forth specific formulations for foamed and non-foamed mats manufactured in accordance with the present invention. As will be understood by those skilled in the art, these formulations are for the vinyl 23 from which the mat 10 edges 16 and 18 are formed. The formulas for vinyl 22 for middle region 12 differ in pigmentation compared to that of the edges 16 and 18. For example, instead of having a yellow pigment, the middle region has a pigment of a different color, for example, black. In addition, the middle region does not usually include the phosphorescent material in the formula for vinyl 22.

EXAMPLE 1

The following formulation may be used for an "anti-fatigue" mat having a foam structure:

| | Per Hundred Weight of Resin |
|---|---|
| PVC Dispersion Resin | 60–85 |
| PVC Blending Resin | 40–15 |
| Inorganic Filler | 5–35 |
| Phthalate Ester | 35–70 |
| Azodicarbanomide | 5–15 |
| EPO | 5 |
| Mark 2031 | .5–1.5 |
| Diarylide Yellow | 2–10 |
| Zinc Sulfide | 20–90. |

EXAMPLE 2

A non-foamed or "solid" formulation is as follows:

| | Per Hundred Weight of Resin |
|---|---|
| PVC Dispersion Resin | 60–85 |
| PVC Blending Resin | 40–15 |
| Inorganic Filler | 5–35 |
| Phthalate Ester | 35–70 |
| Heat Stabilizer | 1–5 |
| EPO | 5 |
| Diarylide Yellow | 2–10 |
| Zinc Sulfide | 20–90. |

Further information follows about the materials set forth above:

The polyvinyl chloride ("PVC") dispersion resin provides the plastic base for both the edge regions 16 and 18 and the middle region 12. Resins suitable for use as the PVC Dispersion Resin, include but are not limited to paste grade polyvinyl chloride resins. Paste grade polyvinyl chloride resins have fine particle size (0.1–2.0 microns) and are made by emulsion polymerization. Specific PVC resins which are suitable for use as this component include, but are not limited to: Geon 121, 124 and 125 sold by Geon Company, formerly part of B. F. Goodrich; VC 440 and 410M, sold by Borden, Inc.; 675F and 654H sold by Oxychem; and EH 255 and EH 219, sold by Georgia Gulf, Inc.

The polyvinyl chloride ("PVC") blending resin is a large particle-size resin which lowers costs and allows the viscosity to be controlled during processing through its effect on plasticizer absorption and particle packing. Resins suitable for use as the PVC Blending Resin, include but are not limited to suspension polymerized PVC resins, which are produced such that, during polymerization, water is the continuous phase and the monomer is suspended in water. Specific PVC resins which are suitable for use as this component include, but are not limited to: Geon 217, sold by Geon Company; M70, sold by Goodyear; and VC 260, sold by Borden.

The inorganic filler is an inert inorganic material which is added to the resin during processing. Inert, as used herein, means that the filler does not react with any of the other resin components. Any inorganic material known to those skilled in the art can be used in the present resin, as long as it does not adversely impact the final properties of the resin. The inorganic filler can be used to decrease the cost of the resin, control the viscosity of the resin during processing and to increase the hardness of the resin. The amount of the inorganic filler can be varied to control these properties, as known to those skilled in the art. Suitable inorganic fillers include, but are not limited to: calcium carbonate, silicon dioxide, talc, clay, calcium silicates, barium sulfate, magnesium silicate, and kaolin.

The PVC resin composition also preferably contains plasticizers, which add softness, flexibility and processability to the resins. Those plasticizers which are known to those skilled in the art to be useful with PVC compounds can be used in the present resins. A preferred class of plasticizers are phthalate esters. Non-limiting examples of these compounds include: di-isononyl phthalate, di-hexyl phthalate, di-isodecyl phthalate and butyl benzyl phthalate. Other plasticizers such as adipates, azelates, benzoates, and citrates, could also be used with some degradation in properties and increased expense.

When a foamed PVC resin composition is desired, the resin composition should contain a blowing agent. A variety of blowing agents are known to those skilled in the art. These materials release gaseous substances on decomposition, such as carbon dioxide or nitrogen. This generates the foamed resin's cellular structure. One preferred chemical blowing agent is azodicarbanomide, which generates nitrogen gas upon decomposition.

Hydrazides could also be used as blowing agents, but the system would have to be reformulated to accommodate the lower decomposition temperature and lower gas evolution, and cost would be increased.

EPO—Epoxidised soybean oil; purpose: heat stability during processing and plasticization.

The foamed PVC resins preferably contain a cell stabilizer to stabilize the formation of the foam cells in the resin during processing. Non-limiting examples of cell stabilizers include: Mark 2031, sold by Witco.

The resin compositions also preferably contain a dye or pigment to impart color thereto. The resin used to form edge strips 16 and 18 preferably is a bright color, such as yellow, orange or red, which provides a distinct color and path under normal lighting. Non-limiting examples of suitable pigments for the edge strips include: Diarylide Yellow, an organic yellow sold by Hoechst Celanese. The middle region 20 should be a different color from the edge regions. Preferably, the middle region is black. Non-limiting examples of suitable pigments for the middle region include: carbon black, iron oxides, titanium dioxide and organic pigments.

In addition to the visible pigments described above, the resins used to form edge strips 16 and 18 also contain a phosphorescent pigment. The purpose of this pigment is to provide phosphorescence after the removal of a light source. Suitable phosphorescent pigments include, but are not limited to: zinc sulfide, cadmium sulfide, radium, luciferin/luciferase, and strontium sulfide. The use of radium is, of course, not preferred for safety reasons. One preferred pigment is 2330 Excite Yellow sold by U.S.R. Optonix.

The resin should also contain a heat stabilizer, which prevents degradation of the polymers during process. Any heat stabilizer known to those skilled in the art is suitable for use in the present resin compositions. Preferred heat stabilizers are metal based heat stabilizers, such as those containing calcium, barium, cadmium or lead. Non-limiting examples of suitable heat stabilizers include: Vanstay 8586 and Thermchek 139 available from R. T. Vanderbilt.

The order of addition of materials during mixing of the vinyl compound is important for adequate dispersion. The pigments and blowing agent require pre-dispersion to ensure complete color development of the pigment and the finest possible particle size of the blowing agent for cell size consistency. The resins and fillers should be blended into 75% of the plasticizer for high shear during mixing to break down all dry agglomerates before the remaining plasticizer is added. Without proper agglomerate breakdown, there will be poor viscosity control and poor cell size consistency. The diarylide yellow should be pre-dispersed and milled to its minimum particle size, which particle size is approximately 0.1 microns.

Viscosity control of the plastisol is necessary for proper casting and expansion. This may be accomplished through the use of viscosity modifiers. Any viscosity modifier known to those skilled in the art can be used in the present resins. Non-limiting examples of suitable viscosity modifiers include: fumed silica, sold by Degussa; and BYK 4010, sold by BYK Chemie.

Particle size of the filler and pigment must also be controlled. Small particle sizes required for the filler for control of the expansion of the blowing agent and the pigment particle size must permit good tinting strength with translucency to allow the phosphorescence to be observed. Desirable filler particle sizes range from about 5 to about 25 microns. Desirable pigment particle sizes range from about 0.1 microns to 15 microns.

Temperature stability of the plastisol is critical. Inadequate stability will permit degradation of the polyvinyl chloride yielding loss of desired physical properties, discoloration and generation of hydrogen chloride. Plastisol temperature stability is achieved through resin choice, pigment choice and the use of heat stabilizers. Temperature stability is achieved by: (a) Resin choice—some resins have residual emulsifiers present which can decrease heat stability. (b) Pigment choice—some pigments are more thermally stable than others due to their chemical structure. (c) Heat stabilizers—these prevent degradation and color change by scavenging HCL which is generated during thermal breakdown of PVC.

Gelation temperature must be optimized with the decomposition temperature of the azodicarbanomide. This is accomplished by balancing the plasticizer and resin ratios and choosing appropriate resins. Gelation optimization is achieved by: (a) Plasticizer choice—solubility parameters of plasticizers can determine the plasticizer's contribution to gelation temperature. Choosing low or high solubility plasticizers can raise or lower the gelation temperature. (b) Plasticizer amount—the ratio of plasticizer to resin can alter the gelation temperature. In general, the higher the plasticizer level, the higher gelation temperature. (c) Resin choice—resin agglomerate size, emulsifier level, molecular weight, and copolymer presence can affect the gelation temperature.

Casting of the vinyl compound must be controlled in a manner that prevents the yellow border from freely mixing with the central body of the mat 10. This may be accomplished by controlling the viscosity of the resins or through the use of coating dams.

Fusion temperatures and speeds must be optimized to ensure consistent expansion of the foam in producing the anti-fatigue mat of Example 1. This optimization is accomplished by controlling the oven temperature and the dwell time of the resin in the oven to allow the nitrogen gas being formed to become entrapped in the plastisol while it is in a semi-solid gel state. Oven temperature is controlled by thermostats which correct for temperature fluctuations during the processing. Precise control is required to allow the gelation to take place gradually while the blowing agent is decomposing (in a foam mat). The temperatures required range between 385° and 450° F. The dwell time in the oven is determined by the time required to bring the entire mat up to this temperature range. That time is dependent on the temperature of the incoming mat, the mass of mat being processed at one time, and the ability of the oven to quickly compensate for temperature loss due to these factors.

We claim:

1. A floor mat comprising polyvinyl chloride material, said floor mat having an upper surface and a lower surface and having at least one border containing photoactive material uniformly dispersed between the upper surface and the lower surface of the mat that emits light after ambient light has been removed, wherein the polyvinyl chloride material comprises polyvinyl chloride dispersion resin, polyvinyl chloride blending resin, inorganic filler, plasticizer and a heat stabilizer.

2. The floor mat of claim 1 wherein the plasticizer comprises pthalate ester, the heat stabilizer comprises epoxidized soybean oil and the photoactive material comprises zinc sulfide.

* * * * *